United States Patent Office 2,709,567
Patented May 31, 1955

2,709,567

TURBINE ROTOR BEARING WITH COOLING AND LUBRICATING MEANS

Homer J. Wood, Sherman Oaks, Calif., assignor to The Garrett Corporation, Los Angeles, Calif., a corporation of California Application December 27, 1948, Serial No. 67,506

5 Claims. (Cl. 253—39.1)

My invention relates to a high velocity turbine unit wherein the turbine is driven by a compressible fluid which is cooled by expansion and dissipation of energy in driving the wheel of the turbine, and relates in particular to the compact turbine and fan unit wherein the power covered by the turbine is employed to drive the fan impeller.

The device shown herein is an improvement upon that disclosed in my Patent No. 2,492,672, granted December 27, 1949, for Turbine Driven Fluid Circulation Unit, and relating to a high velocity expansion turbine having extremely high volumetric capacity for a given size and weight of device, thereby making the unit especially suitable for use in aircraft. My present invention is regarded as an important advance over the device disclosed in the copending application for the reason that it has means especially adapting it for continuous operation at impeller speeds exceeding 100,000 revolutions per minute.

It is an object of the present invention to provide an expansion turbine unit having simple means for properly lubricating its bearings so that heat generation by the bearings is minimized.

It is a further object of the invention to provide an expansion turbine unit having simple and effective means for preventing overheating of the bearings, thereby greatly increasing the velocity at which the rotary parts of the device may be revolved without danger of bearing failure.

It is a further object of the invention to provide an expansion turbine unit having simple and effective means for circulating a mist of oil through the bearings, and also it is an object of the invention to provide a simple means for cooling the bearings and abstracting heat from the light oil mist which circulates through the bearings during the high speed operation of the device.

A further object of the invention is to provide in a device of this character a lubricant circulating system and means for minimizing loss of lubricant from the system.

A further object of the invention is to provide in this device means for equalizing pressures adjacent the ends of bearing chamber to such extent that loss of lubricant from the end or ends of the bearing chamber will be substantially prevented.

A further object of the invention is to provide a turbine driven unit of the character described especially adapted to use, for example in aircraft, where minimum size and weight for a given capacity are required.

Further objects and advantages of the invention will be brought out in the following part of the specification wherein I have made a detailed disclosure of the invention for the purpose of disclosing the preferred embodiment without limiting the scope of the invention set forth in the appended claims.

Referring to the drawings which are for illustrative purposes only:

Figure 1:
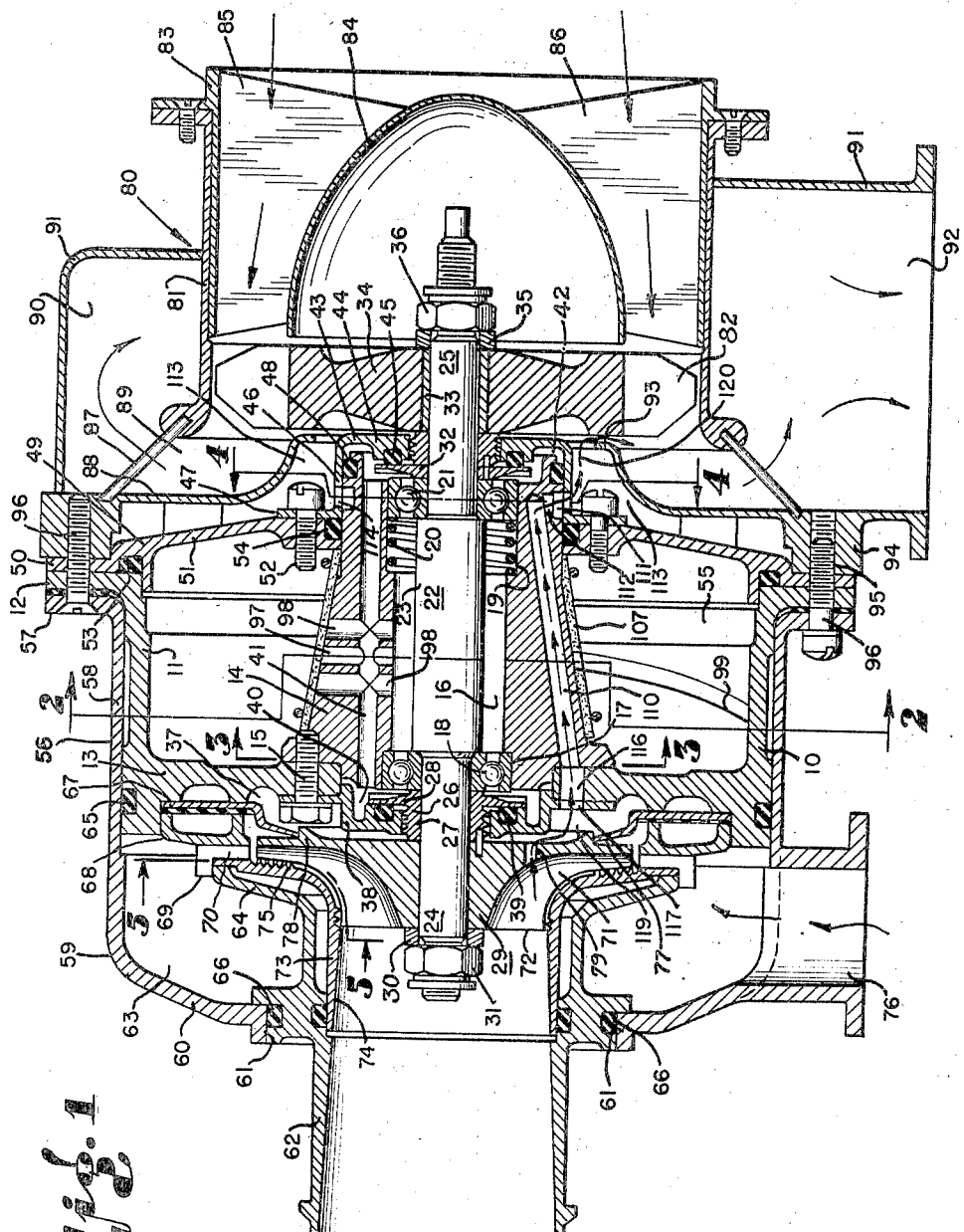
Fig. 1 is a longitudinal sectional view of a preferred embodiment of the invention.

As shown in Fig. 1, the device has a main frame member 10 comprising a cylindric wall 11 and inwardly extending wall 13 to which the bearing support 14 is secured by a plurality of screws 15. The bearing support 14 is tubular. Its axial opening 16 defines a bearing chamber and has at its leftward end a counterbore 17 to receive the outer race of a ball bearing 18, and has at its rightward end a counterbore 19 which receives a bearing-loading spring 20 and the outer race of a ball bearing 21.

The ball bearings 18 and 21 support a shaft 22 having a central body 23, a front stem 24 and a rear stem 25. The front stem 24 has at its inner end the ball bearing 18 and adjacent the bearing 18 there is a slinger or fan element 26 comprising a hub 27 and a radially extended annular wall 28. Upon the front stem 24 of the hub 27 of the slinger 26 there is a turbine wheel 29, in turn followed by a washer 30 and a securing nut 31. In a like manner the rear stem 25 has thereon the inner race of the bearing 21, a slinger disc 32, a sleeve 33 which carries a fan 34, a washer 35 and a nut 36.

In the front face of the wall 13 there is a shallow annular recess 37 in which an annular plate 38 is secured by the screws 15. The inner portion of the plate 38 extends across the leftward face of the radial wall 28 of the slinger 26 and fits closely around the hub 27. Also, the inner portion of the plate 38 carries an annular gasket 39 for engagement with the outer face of the wall 28. The plate 38 forms an annular chamber 40 at the leftward ends of a plurality of lubricant circulation passages 41 which extend through the bearing support 14 from end to end thereof, externally of the axial opening 16 and substantially parallel to the axis of the shaft 22. A similar annular chamber 42 is formed at the rightward end of the bearing support 14, in communication with the rightward ends of the passages 41, by a cup member 43 having a radial wall 44 which extends across the rightward face of the slinger disc 32 and fits closely around the leftward end of the sleeve 33, this wall 44 carrying an annular gasket 45 in engagement with the rightward face of the slinger disc 32. The cup member 43 has a cylindric wall 46 extending leftwardly from the periphery of the wall 44 externally of the rightward end portion of the bearing support 14, there being an outwardly extending radial flange 47 at the leftward end of the cylindric wall 46. An annular sealing member 48 is disposed between the rightward end of the support 14 and the cylindric wall 46 of the cup member 43.

A closure plate 49 is provided for the rightward end of the frame member 10, this closure plate 49 having a flange 50 which fits against the rightward face of the flange 12 of the cylindric wall 11, and an inwardly extending wall portion 51 which extends into close proximity to the rightward external portion of the bearing support 14 and engages the flange 47 of the cup member 43, the flange 47 being secured thereto by screws 52. A sealing ring 53 is disposed between the flanges 50 and 12 and a sealing ring 54 is held between the inner portion of the wall 51 and the contiguous surface of the bearing support 14, so as to seal the lubricant reservoir 55 defined by the cup shape frame member 10 and the closure plate 49.

A shell 56 is provided having a flange 57 for cooperation with the flange 12, a cylindric wall 58 which surrounds the cylindric wall 11 of the frame 10, a leftward extension 59 of the cylindric wall 58 and a converging wall 60 having a flanged opening 61 to receive a tubular cooled air outlet 62 which extends within the annular space 63 defined by the wall portions 59 and 60 and has a flaring wall 64. Sealing rings 65 and 66 are disposed between the shell 56 and the members 10 and 62, to seal the annular space 63. In the outer portion of the shallow recess 37, in surrounding relation to the plate 38 there is a sealing ring 67 which is held in place by an annular nozzle member 68 having a plurality of curved vanes 69 disposed in spaced relation along a circular path so as to define air inlet nozzles 70 leading from the annular space 63 to the periphery of the turbine wheel 29, whereby air will be delivered into the outer ends of the air channels 71 of the wheel 29 defined by the vanes 72 of the wheel 29. A liner 73 is disposed between the rightward portion of the cooled air outlet 62 and the turbine wheel 29, this liner having a tubular portion 74 and a flared portion 75, the peripheral portion of which is clamped between the periphery of the flaring wall 64 and the leftward faces of the nozzle forming vanes 69 when the parts are assembled as shown. The shell 56 has a compressed air inlet 76 for the annular space 63.

The sealing ring 67 has an annular lip 77 extending toward the rightward face of the turbine wheel 29, and the turbine wheel 29 is provided with an annular shoulder 78 disposed in close proximity to the inner edge of the lip 77, to cooperate with the lip 77 in forming a means which will reduce or minimize leakage of compressed air from the periphery of the turbine wheel 29 into the rightward portion of the shallow recess 37. The turbine wheel 29 has at least one small opening 79, spaced inwardly from the periphery thereof and connecting the front and rear faces of the turbine wheel 29, for an important purpose which will be hereinafter described.

A fan housing 80 is supported in a position to surround the fan or impeller 34. This housing 80 includes a cylindric wall 81, the leftward portion of which surrounds the blades 82 of the fan 34. An air inlet member 83 is secured in the rightward end of the tubular wall 81. This air inlet member 83 includes a hollow dome 84 and vanes 85 defining air inlet passages 86 leading to the blades 82 of the fan 34. The leftward end of the tubular wall 81 is supported by a plurality of diagonally disposed struts or pins 87 in spaced relation to a radial wall 88 defining in conjunction with the leftward end of the wall 81 an air outlet throat 89 leading from the fan 34 to a scrolled outlet passage 90 defined by a wall 91 and having an air outlet port 92. The wall 88 surrounds the cup member 43 and the inner margin 93 of the wall 88 is deflected rightwardly so as to lie in close proximity to the leftward face of the body of the fan 34. For securing the fan housing 80 in operative position an annular metal body 94 is secured to the radial wall 88 so as to abut the rightward face of the flange 50, this body 94 having threaded openings 95 to receive screws 96 which pass through the flanges 57, 12 and 50, thereby clamping the parts 10, 56, and 80 together.

Figure 2:
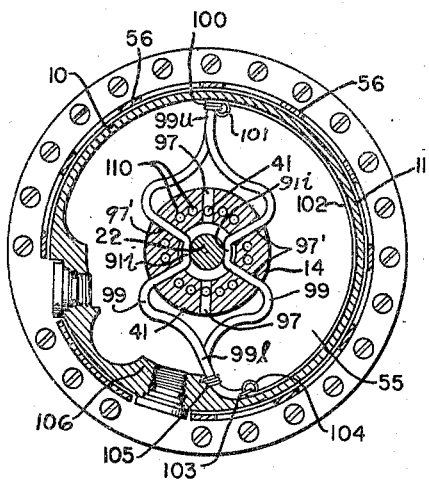
Fig. 2 is a cross section taken as indicated by the line 2—2 of Fig. 1.
Figure 3:
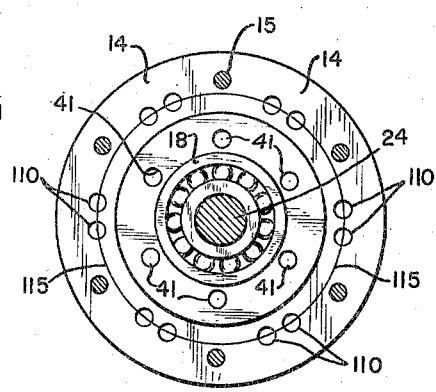
Fig. 3 is a face view of the front end of the bearing holder of the device, taken on the line 3—3 of Fig. 1.
Figure 4:
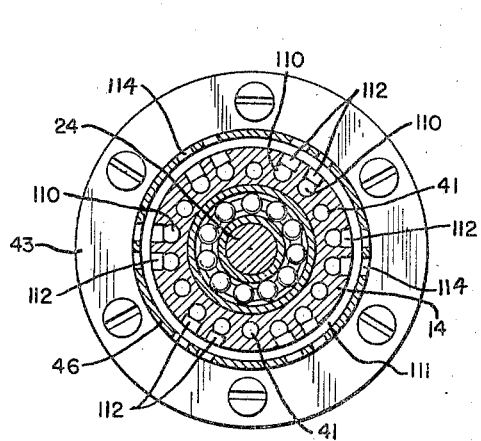
Fig. 4 is a cross sectional view through the rearward end of the bearing holder and associated parts, taken on the plane indicated by the line 4—4 of Fig. 1.
Figure 5:
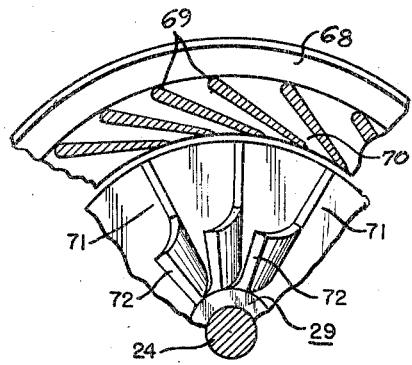
Fig. 5 is a fragmentary sectional view showing a portion of the turbine wheel and the adjacent nozzle member, taken as indicated by the line 5—5 of Fig. 1.

In Fig. 3 which is a front end view of the bearing support 14 prior to its placement in the frame 10 and in the sectional view, Fig. 4, the lubricant circulation passages are shown as being six in number for the particular size of device disclosed in the present application. Intermediate the ends of the bearing support 14, as shown in Fig. 1, radial openings 97 and 98 are drilled through the wall of the support 14 so as to connect the intermediate portion of each passage 41 with the axial opening 16, between the bearings 18 and 21. As shown in Fig. 2 lubricant applying wicks 99 are threaded through pairs of the laterally directed radial openings 97 indicated specifically by the numerals 97' so that the intermediate portions 91i of the wicks 99 will be disposed in the axial opening 16 and will engage the body 23 of the shaft 22 at an intermediate portion and apply thereto a small quantity of oil. The upper ends 99u of the wicks 99 are brought together and by tie means 100 are tied to a loop 101 formed at the upper end of a wick holder 102 which consists of a spring wire bent to correspond to the curvature of the cylindric wall 11 of the frame 10. The lower ends 99l of the wicks 99 are brought together and are tied at 103 to a loop 104 formed at the lower end of the wick holder 102. A tie 105 may be employed to secure the lower ends 99l of the wicks 99 to a lug 106 formed internally on the shell wall 11. The other ends of the radial openings 97 and 98 are covered by a filter or strainer element 107 which may consist of a fibrous sheet or fabric, to prevent entry of foreign particles into the lubricant circulation system contained within the bearing holder 14 and between the plate 38 and the cup member 43. When the device is in operation, the fan elements formed by the slinger members 26 and 32, produce flows of air and fine oil mist outwardly through the bearings 18 and 21, radially outwardly in the chambers 40 and 42, thence inwardly through the passages 41 and radially inwardly through openings 97 and 98 into the intermediate portion of the axial opening 16. The chambers 40 and 42 at the opposite ends of the bearing support 14 are connected by the passages 41, with the result that the pressures therein are substantially equal.

In my present turbine driven unit speeds in excess of 100,000 revolutions per minute are attained, thereby giving very high capacity to a relatively small unit. I believe that the manner in which I prevent overheating of the bearings 18 and 21 is an important contribution to the ability of the unit to work at extremely high operating speeds. To provide cooling means for the bearings 18 and 21 passages 110 are formed in the bearing support 14. As shown in Fig. 4, a pair of these coolant passages 110 have their rear or rightward ends between the rightward ends of each pair of adjacent passages 41, and as shown in Figs. 1 and 4 an annular channel 111 is formed near the rightward end of the bearing support 14, this channel 111 communicating with the rightward ends of the passages 110 through radial openings 112, and communicating with the annular space 113 externally of the cup member 43 through openings 114 in the cylindric walls 46 of the cup member 43. As shown in Fig. 1, the passages 110 diverge from the rightward ends thereof to the leftward ends thereof, so that the leftward ends of these passages 110 lie on a circle 115, Fig. 3, larger than the circle defined by the leftward ends of the passages 41. As further shown in Fig. 1, the leftward ends of the passages 110 communicate through openings 116 in the wall 13 and openings 117 in the plate 38 with the annular chamber 119 comprising that portion of the annular recess lying to the right of the lip 77 and the radial wall of the turbine wheel 29. In the operation of the device, compressed air passes through the nozzles 70 and into the air channels 71 of the turbine wheel 29, being thereby cooled. A portion of the air thus cooled passes through one or more openings 79 in the turbine wheel 29 to the space 119. From this space 119 the cold air passes through the passages 110 to the rightward ends thereof, leaving the passages through the openings 112, the channel 111 and the openings 114. The air then passes from the openings 114 and the space 113 and as indicated by arrows 120 mingles with the air in the discharge throat 89 of the fan housing 80. The cold air in the passages 110 cools the metal wall of the bearing support 14, with the result that the air and the oil mist which circulate through the passages 41 and through the axial opening 16 of the bearing support 14 is cooled. In this manner heat generated by the bearings is dissipated into the cold air circulated through the passages 110.

I claim:
1. In a device of the character described: a housing; driven means supported at one end of the housing; gaseous fluid driven turbine means supported at the other end of the housing, said turbine means having a rotor, a fluid inlet space and a fluid discharge passage; a drive shaft interconnecting said turbine means and driven means; a tubular bearing support adjacent said turbine means supported in said housing surrounding said shaft, said tubular bearing support having a central opening through which said shaft extends and circulation passages extending inwardly from the ends of said support and communicating with the central opening, said tubular bearing support further having cooling passages therein in heat exchange relation with said circulation passages and said central opening; axially spaced shaft bearings in said support rotatably supporting said shaft; wall means cooperating with said tubular bearing support to define a chamber at each end of the tubular bearing support, said chambers being positioned axially outwardly of said bearings; means connected with said tubular bearing support for feeding a small quantity of lubricant into said central opening; fan means operable in each of said chambers for drawing gaseous fluid and oil mist into the chambers from between the bearings and circulating the same through said circulation passages; and passage means disposed in fluid communication with said turbine means and said cooling passages for conducting a cooling gaseous fluid from said turbine rotor to said cooling passages of said tubular bearing support so that said cooling gaseous fluid will cool said tubular bearing support by direct contact therewith and thereby cool the gaseous fluid and oil mist which flows in said circulation passages.

2. In a device of the character described: a housing; a tubular bearing support in said housing having cooling passages from end to end thereof and oil mist circulation passages in said support, said oil mist circulation passages having communication with the interior of said tubular bearing support; bearing means carried by the end portions of said bearing support; shaft means supported by said bearing means; a turbine rotor connected to the front end of said shaft means, said rotor and said bearing support being axially spaced to provide a space around said shaft means between said rotor and said bearing support, and said rotor having vanes defining expansion passage means and having at least one opening disposed in said rotor intermediate the ends of said expansion passage means connecting said passage means with the space around the shaft means between said rotor and said bearing support so that cooled gaseous fluid from said rotor will pass through said space to and through said cooling passages of said bearing support; and wall means cooperating with said rotor and forming passages separate from said space to conduct gaseous fluid to and from said passage means of said rotor.

3. In a turbine driven device: a housing having spaced radial walls provided with axially aligned openings; a tubular bearing support supported between said walls, said bearing support having an axial shaft opening and cooling passages in said bearing support extending from end-to-end thereof adjacent said shaft opening; a shaft supported by bearing means in a position extending through said opening of said support; annular members secured to said walls so as to cover the ends of said bearing support, said annular members providing openings through which air may flow into and out of said cooling passages; turbine means having a turbine rotor on said shaft adjacent one of said annular members and means for delivering compressed air to said rotor to drive the same, there being passage means disposed in fluid communication with said openings and said turbine means for diverting a small portion of said compressed air through said openings provided by said annular members and through said cooling passages.

4. In a turbine driven device: a housing having spaced radial walls provided with axially aligned openings; a tubular bearing support supported between said walls, said bearing support having an axial shaft opening axially aligned with said openings of said walls, circulation passages extending in from the ends of said support and cooling passages in said bearing support extending from end-to-end thereof adjacent said shaft opening; a shaft supported by bearing means in a position extending through said opening of said support; annular members secured to said walls so as to cover the ends of said bearing support, said annular members providing openings through which air may flow into and out of said cooling passages; turbine means having a cooling turbine rotor on said shaft adjacent one of said annular members and means for delivering compressed air to said rotor to drive the same, there being passage means disposed in fluid communication with said openings and said turbine means for diverting a small portion of said compressed air, which has expanded in said rotor, through said openings provided by said annular members and through said cooling passages.

5. In a turbine driven device: a housing having spaced radial walls provided with axially aligned openings; a tubular bearing support supported between said walls, said bearing support having an axial shaft opening axially aligned with said openings of said walls and cooling passages in said support extending from end-to-end thereof adjacent said shaft opening; means for securing one end of said tubular bearing support to one of said spaced radial walls with the other end of said support extending slidably in the opening of the other of said spaced radial walls; a shaft supported by bearing means in a position extending through said opening of said support; annular members secured to said walls so as to cover the ends of said bearing support, said annular members providing openings through which air may flow into and out of said cooling passages; turbine means having a turbine rotor on said shaft adjacent one of said annular members and means for delivering compressed air to said rotor to drive the same, there being passage means disposed in fluid communication with said openings and said turbine means for diverting a small portion of said compressed air through said openings provided by said annular members and through said cooling passages.

References Cited in the file of this patent

UNITED STATES PATENTS

| | | |
|---|---|---|
| 1,182,665 | Eynon et al. | May 9, 1916 |
| 1,368,751 | Rateau | Feb. 15, 1921 |
| 1,683,124 | Blasiar | Sept. 4, 1928 |
| 1,955,604 | Peets et al. | Apr. 17, 1934 |
| 2,165,994 | Zerkowity | July 11, 1939 |
| 2,184,197 | Schutte | Dec. 19, 1939 |
| 2,280,585 | Kapitza | Apr. 21, 1942 |
| 2,296,703 | Butler | Sept. 22, 1942 |
| 2,401,826 | Halford | June 11, 1946 |
| 2,440,890 | Birman | May 4, 1948 |
| 2,475,316 | Garraway | July 5, 1949 |
| 2,492,672 | Wood | Dec. 27, 1949 |
| 2,606,501 | Dreibilbis | Aug. 12, 1952 |

FOREIGN PATENTS

| | | |
|---|---|---|
| 16,729 | Norway | Dec. 6, 1906 |